June 16, 1931.  R. B. MORSE ET AL  1,810,434
PIPE CONNECTION
Filed March 18, 1930
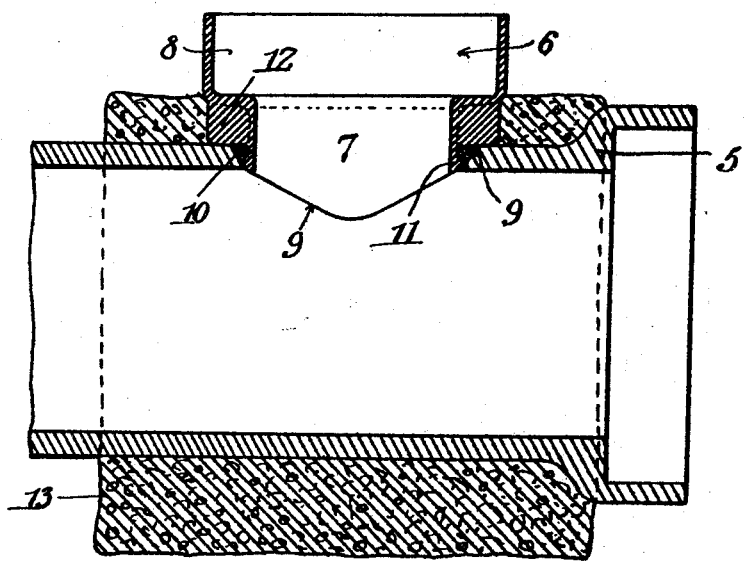
Fig. 1.
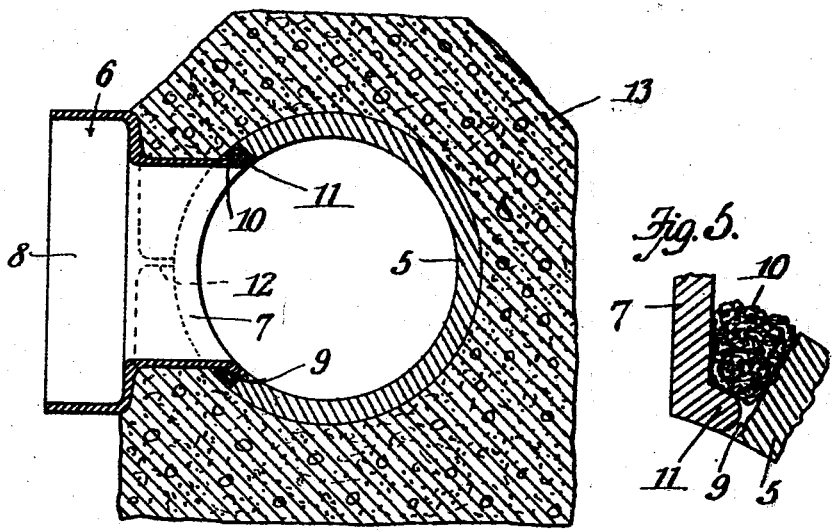
Fig. 2.
Fig. 5.
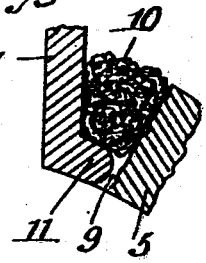
Fig. 3.
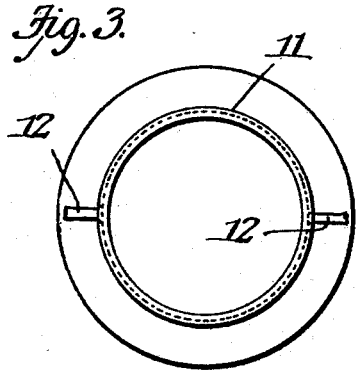
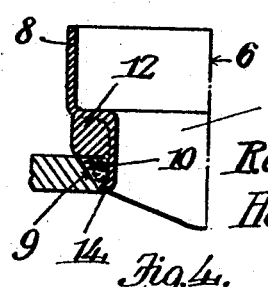
Fig. 4.
Robert B. Morse
Howard R. Devilbiss,
INVENTORS
BY [signature]
ATTORNEY.

Patented June 16, 1931

1,810,434

UNITED STATES PATENT OFFICE

ROBERT B. MORSE, OF HYATTSVILLE, AND HOWARD R. DEVILBISS, OF RIVERDALE, MARYLAND

PIPE CONNECTION

Application filed March 18, 1930. Serial No. 436,765.

This invention relates generally to pipe connections, and particularly to improvements in provisions for connecting branches to sewer pipes.

In providing for branch pipe lines, when it is definitely determined where the branch line will be required, it is the general practice to place in the main sewer line a pipe having a branch or branches disposed perpendicular to the main pipe or at another desired angle and to which the branch is connected. In instances, however, where main sewer lines are laid through unimproved or undeveloped property, it is usually impossible to determine with any degree of accuracy where a branch line will be required, and therefore it is impractical and highly expensive to install pipe sections having branches associated therewith for the reason that when the adjacent property is developed the branch line seldom coincides with such pipe section. Moreover, it is often required that branches be connected to the main line at places where no such branch pipe connection occurs, and it is necessary, therefore, that the branch line be "tapped in" to the main line.

It is the primary object of the present invention to provide means of simplified and improved nature whereby branch connections may easily and quickly be made in the main line wherever desired, and in such manner that a strong and tight joint is assured. This object is accomplished by means of a specially constructed union member associated with the main and branch pipes in a manner hereafter fully set forth and described.

In the drawings:

Fig. 1 is a fragmentary sectional view taken longitudinally through a section of sewer pipe and illustrating the application thereto of a union member constructed and assembled in accordance with the invention, Fig. 2 is a view taken transversely through a section of main sewer pipe and showing associated therewith the improved union member; the said union member providing horizontal connection with the main sewer line, Fig. 3 is a bottom plan view of the improved union member, Fig. 4 is a fragmentary sectional view taken through a portion of a union member involving a slight modification, and Fig. 5 is an enlarged fragmentary section taken through one side of the inner end of the neck member.

The device of our invention is shown and described in connection with sewer pipe of clay, terra cotta, or concrete, but it will be understood, of course, that, with possible minor modifications, it may equally as satisfactorily be employed with pipes made of iron or other material.

In carrying out the invention, the main pipe 5 will have an opening or hole cut therein at the point and at the proper angle where it is desired the branch shall connect. These openings may be readily cut by methods and with instruments well-known to those familiar with such work.

The opening will be of a size to properly accommodate the inner end of a union member indicated generally at 6. This union member includes a neck 7 and a bell portion 8; the neck having an internal diameter corresponding substantially with the internal diameter of the branch pipe, while the bell 8 receives the end of the branch pipe with sufficient clearance for calking or sealing operations.

In making the opening or hole in the main pipe 5, it is preferred that the edges thereof be inclined or beveled as indicated at 9 of the drawings, in order to permit of the introduction of a packing or sealing substance or material such as jute, indicated at 10, to prevent cement, dirt or other foreign matter dropping or protruding through into the main pipe. The outer periphery of the neck 7 is provided with a projection, bead or flange 11, which partly if not entirely closes the space between the inner end of the neck and the opening in the main pipe 5. This projection or bead forms an abutment against which the jute or other sealing material engages when pressed into the opening in the pipe, and prevents the packing material passing into main pipe.

In making connections of this character, for reasons well-known to those familiar with such work, it is essential that there be no protuberances upon the interior of the main pipe and that no part of the coupling or union project into the main pipe. To this end, the union member is provided with stops 12 so arranged as to engage with the outer surface of the pipe 5 when the inner end of the neck 7 thereof has reached the inner periphery of the said pipe 5. The stops in the present instance take the form of webs 12 disposed preferably at diametrically opposite points upon the neck 7 and preferably formed integral with the said union member. The inner ends of the stop members are spaced from the corresponding end of the neck 7 a distance substantially equal to the thickness of the wall of the pipe 5, whereby to insure a proper fitting of the neck 7 within the pipe opening and without possibility of the neck projecting into the main pipe.

When the union member has been properly applied to the opening and held in proper position therein, jute or other packing or sealing material 10 is inserted between the edges of the opening and the neck and may be pressed firmly in this space and against the shoulder or bead 11 of the neck, whereupon cement or other material 13 is then packed around the pipe and also around the union member and firmly between the shoulder of the bell 8 and the main pipe 5. When this cement has hardened, the union member will be firmly sealed and held rigidly wth the main pipe and in such manner that leakage at the joint will be prevented. The branch pipe may then be fitted to the bell 8 and packed in the usual manner, whereupon the connection is complete.

In this description, the shoulder at the inner end of the neck 7 has been referred to as a bead 11, but it is obvious that variations in this structure may be made. For instance, the inner extremity of the neck may be flared outwardly as indicated at 14 in Fig. 4, or, the bead or flared portion may take the form of several projections arranged in spaced order around the periphery of the neck.

It is preferred that the union member 6 be formed of cast metal, but other materials might be employed in the construction of this member as desired. The stops 12 have been shown and described as webs arranged at diametrically opposite points upon the union member, but it will be understood that these stops may take the form of spurs or lugs arranged at any desired point or points around the exterior of the neck 7.

In applying the union member, the stops will limit the inward movement of the neck, so that no part of the latter will project into the main pipe, and the said member will be braced or supported and held at the proper angle by any suitable means until the concrete 13 is applied. The invention contemplates that the neck be sufficiently long to permit of ample space for the application of packing 10 entirely around the neck so as to insure against foreign matter falling or protruding into the main pipe when the plastic cement is applied. It is for this reason that the annular shoulder defining the bell 8 is maintained a proper distance from the surface of the pipe 5 by the said stops 12.

Having thus described our invention, we claim:

1. The combination with a main pipe having an opening therein, of a union member, a neck on said member projecting in said opening, a bead on said neck disposed in close proximity to the edges of said opening, a stop on said member to engage the outer surface of said pipe, and packing surrounding said neck and resting upon said bead.

2. The combination with a main pipe having an opening therein, of a union member, a neck on said member projecting into said opening, a bead on the exterior of said neck at the inner end thereof and disposed in close proximity to the edges of said opening, means removed from said bead for limiting the inward movement of said neck, packing surrounding said neck and resting upon said bead, and a material initially plastic surrounding and encasing said main pipe and said neck.

3. A union member comprising a neck, a bead on the exterior surface of said neck at the inner end thereof, and stops disposed at diametrically opposite points on the exterior of said neck and spaced outwardly thereon beyond said bead.

4. A union member comprising integrally formed bell and neck portions, a bead on the exterior surface of said neck at the inner end thereof, and webs projecting outwardly from said neck at diametrically opposite points thereon and beyond the extreme edges of said bead and disposed inwardly from the inner end of said member.

5. A union member comprising a neck, a projection on the exterior of said neck at the inner end thereof, and positioning stops on said neck spaced apart sufficient to permit the application of packing around said neck adjacent to said projection.

In testimony whereof we hereby affix our signatures.

ROBERT B. MORSE.
HOWARD R. DEVILBISS.